H. C. & N. C. ELLIS.
COTTON SEED DRIER.
APPLICATION FILED SEPT. 12, 1914.

1,276,044.

Patented Aug. 20, 1918.
2 SHEETS—SHEET 1.

H. C. & N. C. ELLIS.
COTTON SEED DRIER.
APPLICATION FILED SEPT. 12, 1914.

1,276,044.

Patented Aug. 20, 1918.
2 SHEETS—SHEET 2.

HOT AIR INLET

COLD AIR INLET

Witnesses:
John Enders
Mildred Stumpf

Inventors.
Hubert C. Ellis and
Norman C. Ellis
by Fred Gerlach
their Atty.

UNITED STATES PATENT OFFICE.

HUBERT C. ELLIS AND NORMAN C. ELLIS, OF EVANSTON, ILLINOIS, ASSIGNORS TO ELLIS DRIER AND ELEVATOR COMPANY, OF CHICAGO, ILLINOIS, A CORPORATION OF WISCONSIN.

COTTON-SEED DRIER.

1,276,044.      Specification of Letters Patent.    Patented Aug. 20, 1918.

Application filed September 12, 1914. Serial No. 861,340.

*To all whom it may concern:*

Be it known that we, HUBERT C. ELLIS and NORMAN C. ELLIS, residents of Evanston, in the county of Cook and State of Illinois, have invented new and useful Improvements in Cotton-Seed Driers, of which the following is a full, clear, and exact description.

The invention relates to apparatus more particularly adapted for drying and cooling cotton seed.

Attempts have been made heretofore to dry cotton seed in apparatus embodying a series of vertical shafts and adapted for drying hard grain, such as corn, wheat or the like, but it has been found that apparatus constructed for hard grains will not handle cotton seed owing to the fibrous nature of the latter which causes the kernels to adhere together in a shaft instead of passing freely therethrough by gravity as hard grain does.

One object of the invention is to provide a dried which is adapted to handle cotton seed or similar material and which comprises shafts which are constructed so that the seed will pass therethrough by gravity, the seed being dried and cooled in transit through the shafts. In practice, we have discovered that if these shafts are made slightly flaring from the top to the bottom that it is possible to handle cotton seed in them by gravity.

A further object of the invention is to provide means which will properly control the flow of cotton-seed through the shafts and which may be varied or regulated so that the seed will be properly dried, and cooled if desired, in transit through the shafts, the period during which the seed is subjected to air blast in the shaft, determining the degree of moisture removed therefrom.

This object is attained by providing means at the lower or outlet end of the shaft for positively displacing or separating the lowermost kernels from those in the shaft and delivering them to discharge openings from which they freely fall by gravity.

A further object of the invention is to provide a drier of improved construction which is particularly adapted for handling material such as cotton seed.

Figure 1:
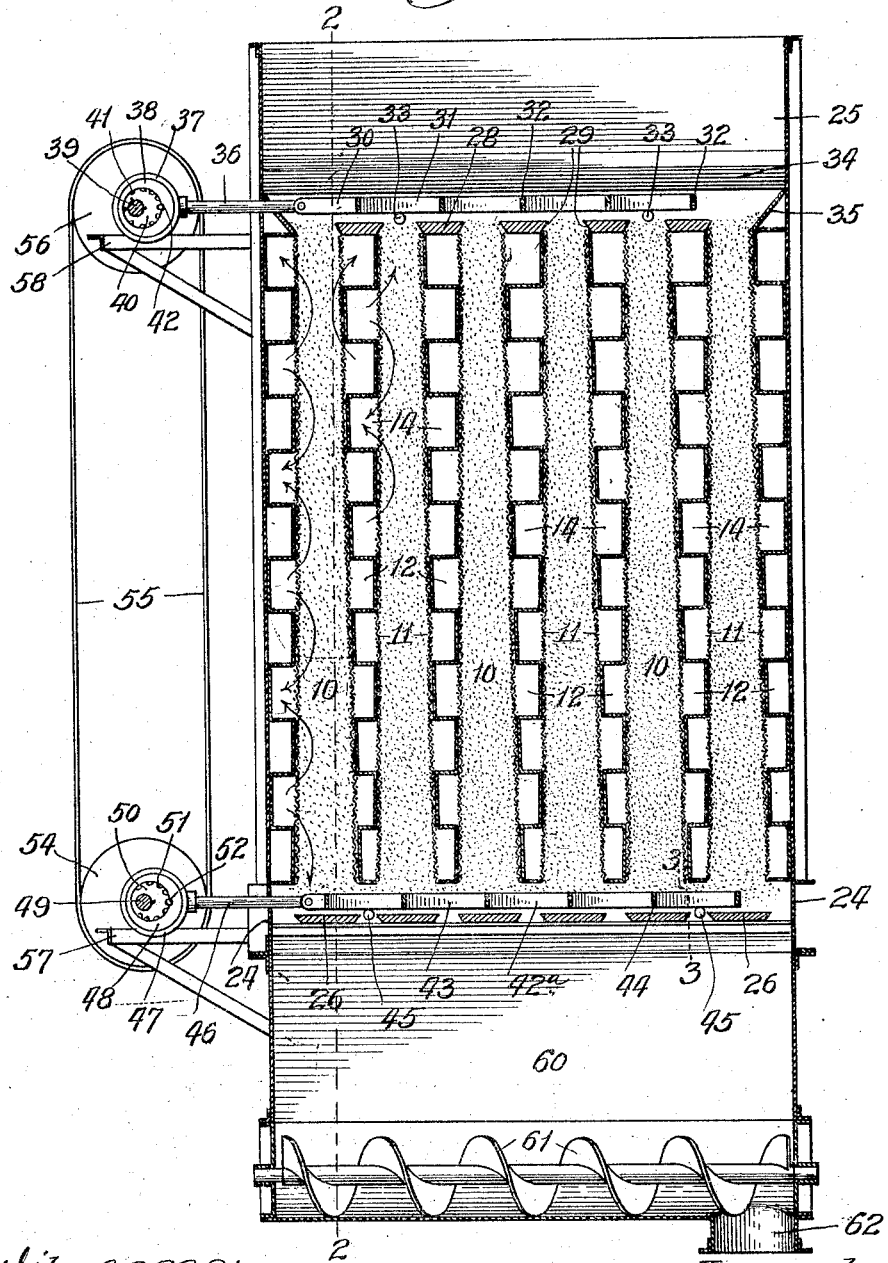
Figure 2:
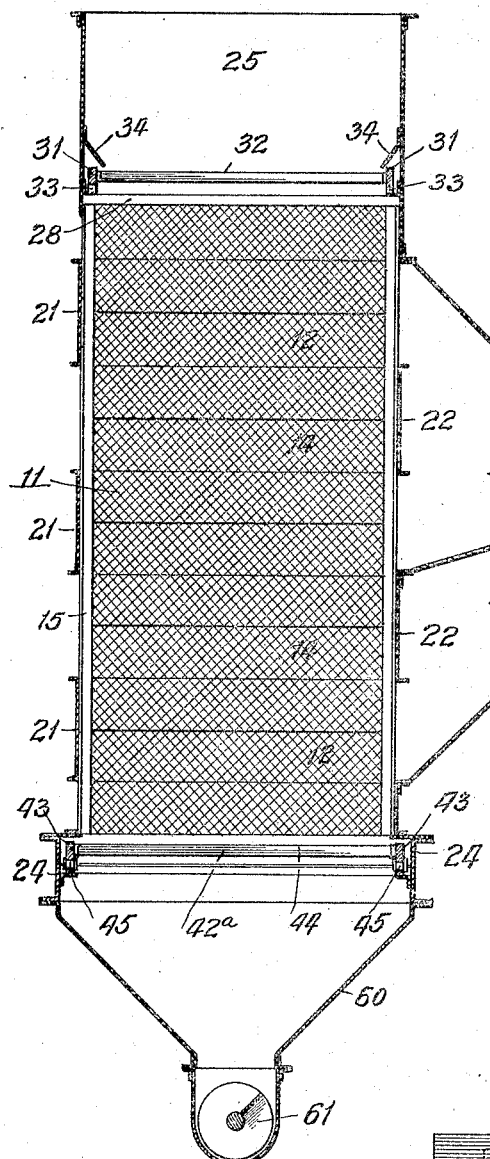
Figure 3:
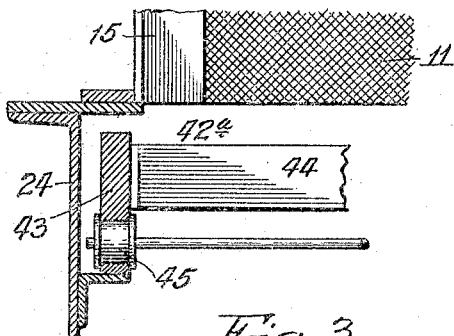
Figure 4:
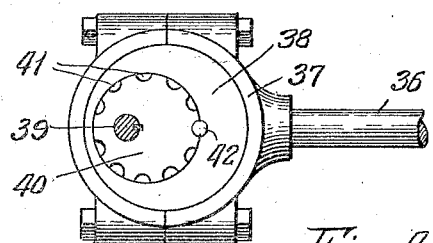
Figure 5:
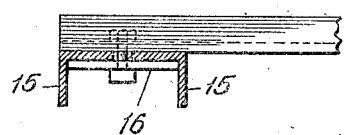

In the drawings: Figure 1 is a vertical longitudinal section of a drier embodying the invention. Fig. 2 is a section taken on line 2—2 of Fig. 1. Fig. 3 is a detail section on an enlarged scale taken on line 3—3 of Fig. 1. Fig. 4 is a detail of one of the eccentrics for operating the displacing rack. Fig. 5 is a detail horizontal section showing the manner of connecting the uprights to the channel bars at the ends of the shafts.

The improved drier comprises a series of vertical shafts 10 formed to hold the cotton-seed in a columnar mass. The sides of these shafts are formed by sheets of foraminous material, such as screen-cloth 11. Between the seed shafts, transversely extending pairs of supply ducts 12 and similarly extending exhaust ducts 14 are alternately disposed. The supply ducts 12 serve to conduct a blast of air to the sides of shafts 10 and the exhaust-ducts conduct the air, after it has passed through the cotton seed in the shafts, out of the drier. The arrangement of these supply and exhaust ducts is more fully set forth in Letters Patent No. 921,097 to Wynn E. Ellis. These ducts 12 and 14 are formed by extending plates of metal across the space between two shafts, thence vertically at one side to form the side wall for one duct, thence across the space to the other side, thence vertically to form a closed side adjacent the shaft at the other side and so on, thus forming or dividing the vertical spaces between the shafts into ducts or flues, opening alternately into the grain shafts between which the plate is arranged.

This construction and arrangement of the ducts causes the air-blast to enter the sides of the shafts through the screen-cloth 11 and to pass through the seed in the shafts and thence upwardly and downwardly through the shafts and seed therein, to the exhaust-flues above and below the supply flues. The sides of the grain-shafts are formed by angle-iron columns or standards 15 to which the screen-cloth, and plates 16 which fill the gaps between these standards are secured.

The invention is illustrated as applied to a combined drier and cooler in which the seed in the upper portion of the shafts is subjected to a blast of hot air to carry off the moisture and the seed in the lower portion of the shafts is subjected to a blast of cold air to cool it. An inlet trunk 18, which receives a blast of hot air from a suitable source of supply, such as a blower, is connected to one end of the upper portion of the drier to conduct the blast to all of the supply ducts 12 in the upper portion of the drier. An inlet trunk 20, which receives a cold air blast from a suitable supply, such as a blower, is connected to one end of all the supply-ducts 12 of the lower portion of the apparatus which is used for cooling the seed. The ends of the supply-ducts 12 opposite the ends which are connected to and receive air from the inlet trunks, are closed by plates 21, so that the blast will be forced to pass through their open sides and into the shafts 10. The ends of the exhaust-flues, adjacent the inlet trunks, are closed by plates 22 so that the blasts will escape only through the opposite ends of these ducts after having passed through the seed in the shafts. The parts forming the shafts and ducts and the standards 15 are secured on a frame 24 formed of channel iron.

The upper ends of shafts 10 are open and in communication with a garner 25 above the shafts. The lower ends of the shafts are also open except for a bar 26 disposed a short distance below the terminal of each of the shafts. In practice, it has been found that cotton seed will not flow regularly or controllably through the shafts having parallel sides of screen cloth and to overcome this difficulty the shafts are flared slightly from the top to the bottom and this has been found in practice to be important in treating cotton-seed and to give very satisfactory results.

Bars 28 are secured at the upper ends of the spaces between the shafts, and the sides of these bars are flared downwardly as at 29, to prevent choking of the seed after it passes between said bars. A reciprocable rack 30 comprising side-bars 31 and a cross-bar 32 for working above each bar 28, is slidably mounted on rollers 33. Deflectors 34 direct the seed over the side-bars 31 to the grain shafts. Deflectors 35 are used over the flues at the lower corners of the garner. Rack 30 is reciprocated by pitmen 36 which are connected to eccentric straps 37 on adjustable eccentrics 38 on a shaft 39. The adjustable connections between the eccentrics 38 and shaft 39, each comprise an eccentric 40 which is keyed to said shaft and has notches 41 in its periphery and a key-pin 42 adapted to lock eccentric 38 to the eccentric 40. By adjustment of the connections between eccentrics 38 and 40, the stroke or throw of the rack 30 may be varied to regulate the feed of seed to the shaft. Cross-bars 32 of the feed rack are mounted to move over the fixed bars 28 and in their reciprocations, the seed in the garner will be shifted and agitated so that it will gradually pass into the spaces between bars 28 and into the shafts 10. These reciprocable racks serve as feed-means for causing the seed to enter the shafts 10.

A rack 42ª is mounted below the shafts 10 and comprises side-bars 43 and cross-bars 44, one above each bottom-bar 26. These side-bars are mounted on rollers 45. Pitmen 46, which are pivotally connected to rack 42, are connected by eccentric straps 47 to eccentrics 48 which are adjustably connected to a drive-shaft 49. The adjustable connections between eccentrics 48 and shaft 49, each comprise an eccentric 50 which is keyed to shaft 49 and is provided with notches 51, and a key-pin 52 whereby the eccentrics 50 and 48 may be locked together. By adjustment of these connections the stroke or throw of cross-bars 44 may be varied to regulate the displacement and discharge of seed from the shafts 10. Drive-shafts 49 and 39 are driven one from the other, by a pulley 54 on shaft 49, a belt 55 and a pulley 56 on shaft 39. It will be understood that one of the shafts 39, 49 will be driven from a suitable source of power. Shaft 49 is mounted in bearings sustained by bars 57 and shaft 39 is similarly mounted on bars 58.

The rack-bars 44 operating over the bottom bars 26 and under the seed shafts 10 displace the seed from the lower end of the shafts to the flared openings between the bars 26 without causing the seed to become packed in the shaft and without causing any choking of the seed. A hopper 60 receives the seed discharged from the shafts and a screw-conveyer 61 conducts the seed to a discharge spout 62.

The operation of the improved drier will be as follows: Assuming the garner 25 to be supplied with cotton seed to be dried and shafts 39 and 49 to be driven at suitable speed, the reciprocating cross-bars 32 of rack 30 working over bars 28, will feed the seed in measured quantity into the shafts 10. The seed will form a comparatively loose columnar mass in the shafts and in transit therethrough will be subjected to a blast of hot air from trunk 18, the blast passing into the shafts through the open sides of the supply-ducts 12, vertically through the stack or mass of seed and into the exhaust-ducts 14. After being dried by the hot blast in the upper portion of the shafts, the seed will be subjected to a blast of cold air from trunk 20, which is forced into the supply-ducts in the lower portion of the drier and passes through the open sides of said ducts into the mass of seed in the shaft and thence vertically through the shafts into the exhaust ducts 14. The cross-bars 44 of rack 43 operating under the columnar masses in the shafts, displace the seed in measured quantity from the bars 26 and cause it to drop through the spaces between said bars. By regulating the throw and speed of the rack bar 42, the period during which the seed is treated may be varied according to the moisture in the seed or the degree of moisture it may be desired to remove therefrom.

The invention thus exemplifies an apparatus which is adapted to handle cotton seed in large quantities and in which special provision is made for preventing the cotton seed from becoming packed or choked in the grain shafts. The mechanism for controlling the discharge of the seed from the shafts and consequently the period of time during which the seed is subjected to air blasts may be regulated.

It will be understood that, if desired, the cooling arrangement may be omitted.

The invention is not to be understood as restricted to the details set forth, since these may be modified within the scope of the appended claims, without departing from the spirit and scope of the invention.

Having thus described our invention, what we claim as new, and desire to secure by Letters Patent, is:—

1. In apparatus of the character described, the combination of a series of transversely extending vertical shafts formed to hold material in a columnar mass and provided with continuous foraminous sides flared from top to bottom to adapt the shafts for the passage of cotton seed, transversely extending supply and exhaust ducts between the flared sides of the shafts, and means for controlling the flow of material through the shafts.

2. In apparatus of the character described, the combination of a series of transversely extending vertical shafts formed to hold material in a columnar mass and provided with continuous foraminous sides flared from top to bottom to adapt the shafts for the passage of cotton seed, transversely extending supply and exhaust ducts between the flared sides of the shaft, bars below the shafts and means for displacing the material laterally from the shafts and the bars to control the flow of the material through the shafts.

3. In apparatus of the character described, the combination of vertical shafts formed to hold material in a columnar mass and having screen-cloth sides, spaces being formed between the shafts, means dividing the spaces into transversely extending supply and exhaust ducts, means for supplying air under pressure to the supply ducts, the sides of said shafts being flared from top to bottom to facilitate passage of the mass through the shafts and means for controlling the flow of material through the shafts.

4. In apparatus of the character described, the combination of vertical shafts formed to hold material in a columnar mass and having foraminous sides, spaces being formed between the shafts, means dividing the spaces into supply and exhaust ducts, means for supplying air under pressure to the supply ducts, the sides of said shafts being flared from top to bottom to facilitate passage of the mass through the shafts and means for displacing the material at the bottom of the shafts.

5. In apparatus of the character described, the combination of vertical shafts formed to hold material in a columnar mass and having foraminous sides, spaces being formed between the shafts, means dividing the spaces into supply and exhaust ducts, means for supplying air under pressure to the supply ducts, the sides of said shafts being flared from top to bottom to facilitate passage of the mass through the shafts, feed means at the top of the shafts, and means for controlling the flow of material through the shafts.

6. In apparatus of the character described, the combination of vertical shafts formed to hold material in a columnar mass, means for supplying air under pressure to the shafts, means for controlling the flow of material through the shafts, comprising bars below the shafts and separated from the lower ends thereof, openings being formed between the bars, and means operating in the spaces between the bars and the lower ends of the shaft for displacing the material from the shafts into the openings between the bars.

7. In apparatus of the character described, the combination of vertical shafts formed to hold material in a columnar mass, means for supplying air under pressure to the shafts, means for controlling the flow of material through the shafts, comprising bars below the shafts and separated from the lower ends thereof, openings being formed between the bars, a rack operating in the spaces between the bars and the lower ends of the shafts for displacing the material from the shafts into the openings between the bars and power-driven means for operating the rack.

8. In apparatus of the character described, the combination of vertical shafts formed to hold material in a columnar mass, means for supplying air under pressure to said shafts, a feed rack disposed adjacent the top of the shafts, a garner above the shafts and displacing means at the lower ends of the shafts for controlling the flow of material through the shafts.

9. In apparatus of the character described, the combination of vertical shafts formed to hold material in a columnar mass, means for supplying air under pressure to said shafts, a reciprocable rack disposed adjacent the top of the shafts, a garner above the shafts, power-driven means for operating said rack, means for varying the throw of the rack, and means at the lower ends of the shafts for controlling the flow of material through the shafts.

10. In apparatus of the character described, the combination of vertical shafts formed to hold material in a columnar mass, means for supplying air under pressure to said shafts, feed means disposed adjacent the top of the shafts, a garner above the shafts, displacing means below the shafts, and a driving connection between the feed-means and the displacing means.

11. In apparatus of the character described, the combination of vertical shafts formed to hold material in a columnar mass, means for supplying air under pressure to said shafts, a reciprocable rack disposed adjacent the top of the shafts, a garner above the shafts, a reciprocable displacing rack at the lower ends of the shafts, mechanism for operating said racks, and means for adjusting the throw of said racks by said mechanism.

HUBERT C. ELLIS.
NORMAN C. ELLIS.

Witnesses:
MILDRED STUMPF,
KATHARINE GERLACH.

Copies of this patent may be obtained for five cents each, by addressing the "Commissioner of Patents, Washington, D. C."